United States Patent [19]

Smith

[11] Patent Number: 5,477,639

[45] Date of Patent: Dec. 26, 1995

[54] APPARATUS AND METHOD FOR IRRIGATING PLANTS

[76] Inventor: Floyd T. Smith, 5112 Richfield Ave., Yorba Linda, Calif. 92686

[21] Appl. No.: 228,228

[22] Filed: Apr. 15, 1994

[51] Int. Cl.⁶ .................................................. A01G 1/08
[52] U.S. Cl. .................... 47/58; 47/33; 47/27; 47/78
[58] Field of Search ....................... 47/58.01, 58 C, 47/79 R, 48.5 G, 27, 78 F, 25, 24

[56] References Cited

U.S. PATENT DOCUMENTS

| | | | |
|---|---|---|---|
| 289,102 | 11/1883 | Holden | 47/79 R |
| 1,530,109 | 3/1925 | Cummings | 47/48.5 G |
| 4,928,426 | 5/1990 | Janssens | 47/27 C |
| 4,955,156 | 9/1990 | Williams | 47/78 F |
| 5,070,642 | 12/1991 | Albrecht | 47/78 F |

FOREIGN PATENT DOCUMENTS

| | | | |
|---|---|---|---|
| 80172 | 7/1894 | Germany | 47/79 R |

Primary Examiner—Henry E. Raduazo
Attorney, Agent, or Firm—Willie Krawitz

[57] ABSTRACT

A device for improving the delivery of water, aeration and fertilizer to the root system of plants provides an open-ended, water retaining, root barrier envelope which is placed around the root system of the plant, and a plurality of root deflector ribs for delivering water, aeration and fertilizer that extend downwardly along the envelope, and which are attached to the root barrier. Water, aeration, and fertilizer which are applied to the plant in the envelope will percolate downwardly through the upper portion of the soil surface embedding the root. The water will also move downwardly through the deflector ribs and then migrate inwardly through the perforations to a sub surface portion which is below the watered portion of the upper soil surface. Hence, the root system within the sub surface portion will be irrigated by water which has migrated inwardly from the envelope, and this will enable the root system to grow both downwardly and outwardly in a more uniform manner, and with less possibility of drying out.

10 Claims, 1 Drawing Sheet

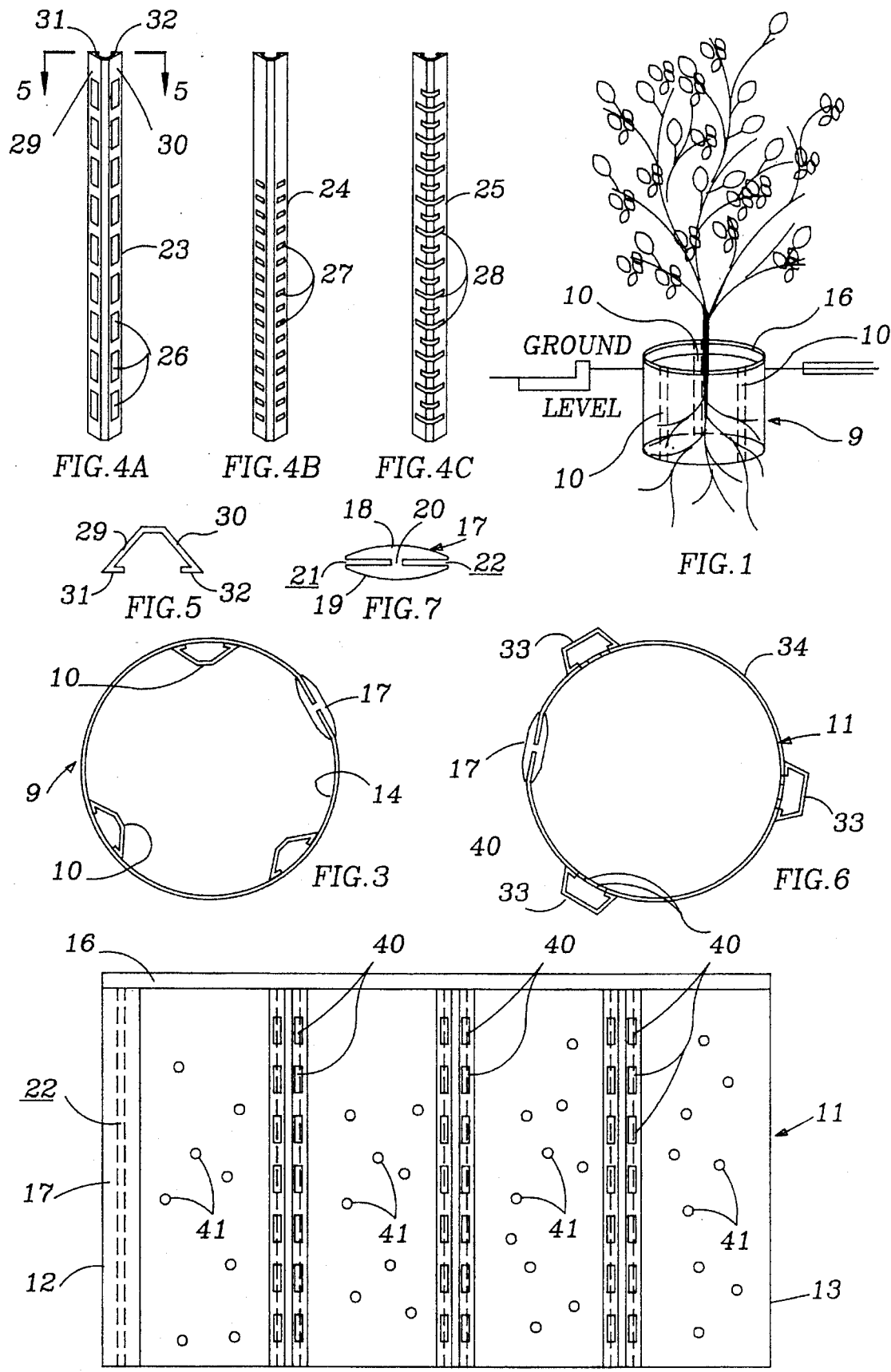

APPARATUS AND METHOD FOR IRRIGATING PLANTS

BACKGROUND OF THE INVENTION

This invention relates to a new and improved device for watering young plants having a relatively small root system which must be watered frequently and effectively in order to prevent the roots from prematurely drying out or freezing.

When young plants such as bushes and trees are planted, they are prone to desiccation due to ineffective watering of the root system. Frequently, even though the upper surface of the ground adjacent the plant is watered, the rapid evaporation of water results in drying out the roots, and this may eventually kill the plant. Occasionally, if an oil residue is present on the soil surface, water will be prevented from moving through the soil and contacting the root ball, causing the tree to die.

In order to retain water in the vicinity of the root system, water impermeable, root barrier envelopes have in the past been installed around the roots; however, this technique presents drawbacks. The problem with employing these envelopes is that while the upper surface near the plant will retain water, the lower surface may receive insufficient water, aeration and nutrients, and this can adversely affect the growth characteristics of the plant. To overcome this problem, presently designed water impermeable root barrier envelopes have included water channels which are attached to the interior side wall of the envelope, and through which water can be channelled to the bottom of the root system.

However, these water channels may not sufficiently irrigate the central portion of the root system, and this can stunt the outward growth of the root system or result in the plant from being killed over a period of time.

Hence, it would be desirable to provide a water retaining, root barrier envelope through which water, aeration and other additives can be delivered to both the intermediate and lower areas of a plant root system.

THE INVENTION

According to the invention, a water retaining, root barrier envelope device is provided, comprising an envelope member for encircling the root system of a plant, and one or more perforated root deflector ribs which are attached to and extend downwardly along the envelope. The root deflector ribs are open ended and perforated along their length to enable water entering the top of the tube to pass downwardly along the deflector ribs and out through both the bottom end, and also out through the perforations. This enables the periphery of the root system to be irrigated not only at its medial area, but water will also be supplied to the bottom of the roots. Consequently, the roots will more readily grow both outwardly and downwardly, and will result in a more healthier plant, with less chance for dying off.

Preferably, the root deflector ribs are mounted along the interior wall of the envelope; however, the deflector ribs may also be mounted along the exterior of the envelope. In the latter case, the envelope is perforated to enable water to leak through and irrigate the medial and lower portions of the root system. Obviously, deflector ribs may be mounted along both the interior and exterior walls of the envelope.

If desired, fertilizer may be inserted into the deflector ribs in solid or liquid form prior to, or during watering, separately or together with insecticides, nematocides, fungicides, etc., as required.

BRIEF DESCRIPTION OF THE DRAWINGS

FIG. 1 is a perspective view showing the water retaining, root barrier envelope of this invention installed around the root system of a plant;

FIG. 2 is a plan view of the water retaining, root barrier envelope shown unfolded in a flat form;

FIG. 3 is a plan view of the water retaining, root barrier envelope shown in FIG. 1, with the porous root deflector ribs installed on the inner wall of the envelope, the ends of the envelope being connected together to form a circular configuration;

FIGS. 4A, B and C are external views, partly in perspective, showing various perforation configurations of porous root deflector ribs which may be used in conjunction with the root barrier envelope;

FIG. 5 is an end elevation view of a porous root deflector rib taken along lines 5—5 of FIG. 4A;

FIG. 6 is a plan view of the water retaining, root barrier envelope of FIG. 2, formed into a circular configuration, and showing the porous root deflector ribs installed on the outer wall of the envelope; and, FIG. 7 is an enlarged view of the end closure element in FIGS. 3 and 6, which is used to connect the ends of the envelope to form a closed, circular configuration;

DESCRIPTION OF THE PREFERRED EMBODIMENTS

The water retaining, root barrier envelope 9 surrounding the roots of a young plant, and porous, root deflector ribs 10 are shown in FIGS. 1 and 3, bonded to the inner wall 14 and about two inches from the top edge of the envelope. Typically the deflector ribs are about 12"–48" in length, and are spaced about 4"–8" around the barrier envelope.

Preferably, the barrier envelope is formed of sheet material which is resistant to soil corrosion, has good tensile properties, and flexible properties, and will prevent water from escaping outwardly from the soil adjacent the root of the plant. Suitable materials include resin cured graphite laminates, plastic molded and extruded materials such as PVC, polyethylene, polystyrene, polypropylene, etc., and which may contain appropriate fillers. The graphite laminates are preferred, due to their durability, and a suitable laminate thickness is about 1/16". The deflector ribs may be formed of similar materials and thicknesses, and may be cast, extruded, injection molded or integrally formed with the envelope.

As shown in FIGS. 2 and 6, the envelope 11 provides a bonding end 12, a free end 13, and defines inner and outer walls 34 and 35. A lip or rim 16 shown in FIGS. 1 and 2 will prevent pedestrians from being injured if they accidentally step onto the top edge of the envelope. An end closure element 17 is bonded to the end 12 of the envelope to enable closing the envelope into a circular configuration. Prior to closure, the envelopes can be stored in a relatively flat stack. End closure element 17 is shown enlarged in FIG. 7, and comprises flat, parallel longitudinal members 18 and 19 separated by a central connecting member 20 to form adjacent slits 21 and 22.

The end 12 of the envelope 11 is bonded into slit 21 to form a tongue and groove arrangement. When the envelope is installed around the roots of a plant, the free end 13 of the envelope is inserted into the slit 22 of closure element 17 to form an open ended, circular configuration, as shown in FIGS. 1, 3 and 6.

Perforated root deflector ribs 23, 24 and 25 having various types of perforations 26, 27 and 28, respectively, are shown in FIGS. 4A, 4B and 4C, and these perforations enable water to migrate through the deflector ribs but prevent dirt from entering through to the root system. A suitably sized perforation 26 of deflector rib 23 is about 1"×¼". The deflector rib 10 shown in FIG. 5 has a somewhat U-shaped configuration in cross section with inclined sides 29 and 30, and inwardly directed edges 31 and 32 which are adhesively bonded to inner wall 14 of the envelope. Other delivery tube configurations can be used such as square, triangular, hexagonal, round, elliptical, etc. In addition to adhesive bonding, the deflector ribs may also be attached to the root barrier envelope by sonic bonding, screws or rivets, etc., or the deflector ribs may be integrally formed with the envelope during its construction, and this latter construction will impart additional reinforcement to the barrier envelope.

FIGS. 2 and 6 show another embodiment of the invention in which deflector ribs 33 are bonded to the exterior wall 34 of the root barrier envelope 11. Perforations 40 extend through the envelope 11 adjacent the deflector ribs 33 and drain water from the delivery tubes 38 through the barrier envelope to feed the root system, particularly at its periphery. The perforations 26, 27, 28 and 40 may be referred to conveniently as a first plurality of perforations or apertures.

If desired, a second plurality of perforations or apertures 41 about ¼" in diameter are formed in the barrier envelope 11 for anchoring purposes, and to permit the plant root system to grow out of the container. For watering the medial and lower roots, the perforations 41 are commenced about one-third to about one-half way down the sidewall of the top of the barrier envelope.

Similarly, for watering the medial or lower portion of the roots, rather than the entire root system, perforations 26, 27 and 28 can be made smaller or even removed at the upper end, as shown in FIG. 4B, resulting in water being directed to the medial and lower roots. For example, perforations 27 shown in FIG. 4B may be commenced from about one-third to about one-half of the way from the top of deflector rib 24.

When water is applied to the ground surface adjacent the plant, it will migrate downwardly into the ground surrounding the roots, and will also enter the ground through the tops of the root deflector ribs. Downwardly migrating water which spreads outwardly towards the root barrier envelope, and which re-enters the root deflector ribs through the perforations, will continue to percolate downwardly through the deflector ribs and feed the lower periphery of the root system. This will result in less opportunity to lose surface water due to evaporation, because surface drainage will occur more quickly.

Moreover, as a further embodiment of this invention, the the deflectors ribs may be eliminated, and perforations 40 and 41 function to both anchor the envelope and enable water to migrate through the envelope wall to irrigate the plant roots and enable the root system to grow through and beyond the container. But this would not result in the same effective use of water compared to that of perforated deflector ribs.

The root barrier envelope of this invention provides a simple device for delivering water effectively to the root system of a plant at any desired root level during the period when a young plant is vulnerable to excessive drying.

I claim:

1. A method for watering a plant root in a ground planting location, comprising:

a) providing an open ended root barrier having at least one flat or gently curving plane surface, defining an inner side adjacent the root port, on, and an otter side remote from the root portion;

b) providing root deflecting ribs which project inwardly from said plane surface in such a manner to deflect the roots to spaced locations on said flat or gently curving plane surface;

c) providing a plurality of first apertures in said root defecting ribs;

d) providing a second plurality of apertures in said flat or gently curving plane surface;

e) feeding water through the upper ends of the root deflector ribs, and downwardly through the perforations and lower ends for discharge to the root portion of the plant; thereby:

i retaining water in the vicinity of the root portion;

ii feeding the root portion partially or entirely:

iii causing the root portion to grow outwardly from the plant toward the envelope;

iv causing the root portion to grow in both a downward direction and outwardly beyond the envelope; and, v anchoring the envelope in the ground planting location, by means of the apertures.

2. The method of claim 1, comprising providing the root deflector ribs with open upper and lower ends.

3. The method of claim 1, comprising mounting the root deflector ribs integrally with the envelope.

4. The method of claim 1, comprising forming the root deflector ribs integrally with the envelope.

5. The method of claim 1, comprising feeding material to the deflector ribs, the material being selected from the class consisting of aeration, fertilizers, nematocides, insecticides and mixtures thereof.

6. The method of claim 1, comprising providing deflector ribs about 12"–48" in length, and spaced at least about 4" around the barrier of the envelope.

7. The method of claim 1, comprising providing deflector ribs about 12"–48" in length, and spaced about 4"–8" around the barrier of the envelope.

8. The method of claim 1, comprising providing a lip on the envelope around its upper edge.

9. The method of claim 6, comprising providing the deflector ribs with apertures about 1"×¼".

10. The method of claim 7, comprising providing the deflector ribs with apertures about 1"×¼".

\* \* \* \* \*